(12) United States Patent
Kondo et al.

(10) Patent No.: US 8,136,339 B2
(45) Date of Patent: Mar. 20, 2012

(54) OIL-IMPREGNATED BUSHING, OIL-FREE CHAIN AND METHOD FOR MANUFACTURING OIL-IMPREGNATED BUSHING

(75) Inventors: Takeshi Kondo, Osaka (JP); Toshihiko Takashima, Osaka (JP); Ikutaro Nakagawa, Osaka (JP); Takahisa Andoh, Osaka (JP); Masahide Komeda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 79 days.

(21) Appl. No.: 12/738,298

(22) PCT Filed: Oct. 23, 2008

(86) PCT No.: PCT/JP2008/069220
§ 371 (c)(1),
(2), (4) Date: Jun. 30, 2010

(87) PCT Pub. No.: WO2009/057503
PCT Pub. Date: May 7, 2009

(65) Prior Publication Data
US 2010/0275571 A1    Nov. 4, 2010

(30) Foreign Application Priority Data
Nov. 1, 2007    (JP) .................. 2007-285184

(51) Int. Cl.
| C10M 169/00 | (2006.01) |
| C10M 157/02 | (2006.01) |
| F16C 33/42  | (2006.01) |
| C22C 38/00  | (2006.01) |
| F16G 13/08  | (2006.01) |
| F16C 33/02  | (2006.01) |

(52) U.S. Cl. .............. 59/8; 59/35.1; 59/78; 508/182; 508/590; 384/531; 474/91; 29/898.054
(58) Field of Classification Search ............. 59/8, 35.1, 59/78; 508/182, 259, 590; 384/531; 29/898.054; 474/91
See application file for complete search history.

(56) References Cited

U.S. PATENT DOCUMENTS
4,615,171 A * 10/1986 Burk ........................... 59/78
(Continued)

FOREIGN PATENT DOCUMENTS
CN    1987147    6/2007
(Continued)

OTHER PUBLICATIONS

Supplementary European Search dated Mar. 28, 2011, from corresponding European Application No. 08 84 4820.

(Continued)

*Primary Examiner* — David Jones
(74) *Attorney, Agent, or Firm* — Katten Muchin Rosenman LLP (57) ABSTRACT

The oil-free chain is obtained by connecting a pair of inner link plates which are connected by oil-impregnated bushings and a pair of outer link plates, which are connected by pins inserted into adjacent oil-impregnated bushings of adjacent inner link plates alternately. The oil-impregnated bushing is obtained by impregnating a bushing made of a metal sintered body with perfluoropolyether having a kinematic viscosity at 40° C. equal to or higher than 350 mm$^2$/s. The bushing is impregnated with perfluoropolyether having a kinematic viscosity corresponding to the operating temperature of the oil-free chain.

9 Claims, 6 Drawing Sheets

U.S. PATENT DOCUMENTS

| | | | |
|---|---|---|---|
| 4,995,852 A * | 2/1991 | Takahashi et al. | 474/91 |
| 5,282,688 A * | 2/1994 | Kanezaki et al. | 29/898.054 |
| 5,412,934 A * | 5/1995 | Furuyama | 59/78 |
| 6,420,321 B1 * | 7/2002 | Akiyama et al. | 508/259 |
| 6,855,081 B2 * | 2/2005 | Koschig | 59/78 |
| 7,939,477 B2 * | 5/2011 | Hashida et al. | 508/182 |
| 8,016,490 B2 * | 9/2011 | Hosoya et al. | 384/531 |
| 2007/0155563 A1 | 7/2007 | Aoki | |
| 2008/0032904 A1 * | 2/2008 | Watanabe et al. | 508/590 |
| 2010/0256027 A1 | 10/2010 | Miyamoto et al. | |

FOREIGN PATENT DOCUMENTS

| | | |
|---|---|---|
| EP | 2 034 217 | 3/2009 |
| JP | 07053984 A | 2/1995 |
| JP | 2003147380 A | 5/2003 |
| JP | 2004108442 A | 4/2004 |
| JP | 2004286115 A | 10/2004 |
| JP | 2007162934 A | 6/2007 |
| WO | 2007/052522 | 5/2007 |

OTHER PUBLICATIONS

International Search Report dated Jan. 27, 2009, which was issued for PCT/JP2008/069220.

Chinese Office Action dated Aug. 3, 2011, from corresponding Chinese Application No. 200880108907.2.

* cited by examiner

OIL-IMPREGNATED BUSHING, OIL-FREE CHAIN AND METHOD FOR MANUFACTURING OIL-IMPREGNATED BUSHING

This application is the national phase under 35 U.S.C. §371 of PCT International Application No. PCT/JP2008/069220 which has an International filing date of Oct. 23, 2008 and designated the United States of America.

BACKGROUND

1. Technical Field

The present invention relates to: an oil-impregnated bushing made of a metal sintered body impregnated with lubricating oil; an oil-free chain, which is to be used for a power transmission mechanism, a conveyance mechanism and the like and is constructed in a manner such that an oil-impregnated bushing and a pin are in sliding contact with each other in a state where the lubricating oil for impregnation of the oil-impregnated bushing oozes out without additional lubrication; and a method for manufacturing an oil-impregnated bushing.

2. Description of Related Art

Conventionally, a chain such as a bushing chain or a roller chain has been used as a power transmission mechanism and a conveyance mechanism. A bushing chain is constructed by connecting a pair of inner link plates which have both end parts connected by two bushings (bearing bushing), and a pair of outer link plates which are connected by two pins inserted into adjacent bushings of two pairs of inner link plates, alternately. In the case of a roller chain, rollers fitted on bushings are further provided.

An oil-free chain, which uses an oil-impregnated bushing made of a sintered body impregnated with lubricating oil as a bushing for a chain having the structure described above and is constructed in a manner such that the oil-impregnated bushing and a pin are in sliding contact with each other in a state where the lubricating oil for impregnation of the oil-impregnated bushing oozes out without additional lubrication, is known.

Japanese Patent Application Laid-Open No. 2004-286115 discloses an invention of an oil-free chain obtained by impregnating a bushing with fluorine-binding oil having a straight-chain structure or a side-chain structure.

SUMMARY

As disclosed in Japanese Patent Application Laid-Open No. 2004-286115, to impregnate a bushing with fluorine-binding oil (perfluoropolyether: PFPE) in order to enhance the lubrication performance in a high-temperature range is generally known. In, Japanese Patent Application Laid-Open No. 2004-286115, PFPE is compounded with polytetrafluoroethylene (PTFE) in order to further enhance the lubrication performance.

For impregnating a bushing made of a metal sintered body with the lubricating oil described above, a series of processes are performed to draw a vacuum, dip a bushing in lubricating oil and then introduce ambient air so as to cause osmosis of the lubricating oil into the bushing.

In the case where an oil-impregnated bushing is used as a bearing for a chain, the oil-impregnated bushing and a pin (or a shaft) generally slide at low speed and at high contact pressure and oscillate unlike the case where an oil-impregnated bushing is used as a bearing for high-speed rotation movement of a motor or the like, and therefore the optimum kinematic viscosity of the lubricating oil for impregnation of the oil-impregnated bushing needs to be higher than that of lubricating oil for the bearing for rotational movement of a motor or the like.

In the case of an oil-free chain in, Japanese Patent Application Laid-Open No. 2004-286115, the kinematic viscosity of PFPE is decreased under high-temperature environment, causing the problems that PFPE tends to flow out from pores of the oil-impregnated bushing and from a sliding part, oil film discontinuity arises, it becomes impossible to retain lubricity of a sliding contact face over a long period of time, and the abrasion elongation-resistant life of the chain is shortened.

The present invention has been made in view of such a situation, and the object thereof is to provide an oil-impregnated bushing constructed by impregnating a bushing with lubricating oil having a kinematic viscosity of 350 mm$^2$/s or more at 40° C. whereby the lubricating oil has a sufficiently high kinematic viscosity even under high-temperature environment when said oil-impregnated bushing is used as a bearing for an oil-free chain or the like, and therefore oil film discontinuity does not arise at a sliding part and a favorable abrasion resistant life is realized.

Another object of the present invention is to provide an oil-free chain employing the oil-impregnated bushing whereby the lubricating oil has a sufficiently high kinematic viscosity even when the oil-free chain is used under high-temperature environment such as an ambient temperature of 150° C. to 250° C., and therefore oil film discontinuity does not arise at a sliding part, the lubricity of a sliding contact face is retained favorably over a long period of time and a preferable abrasion elongation-resistant life is realized.

Another object of the present invention is to provide a method for manufacturing an oil-impregnated bushing comprising a step of impregnating a bushing with lubricating oil having a kinematic viscosity corresponding to the operating temperature of the oil-impregnated bushing whereby the lubricating oil has a sufficiently high kinematic viscosity under high-temperature environment when said oil-impregnated bushing is used for a bearing of an oil-free chain or the like, and therefore oil film discontinuity does not arise at a sliding part and a favorable abrasion resistant life is realized over a long period of time.

The present inventors earnestly made a study to solve the problems described above and found that oil film discontinuity does not arise at a sliding part under high-temperature environment and a favorable abrasion resistant life is realized when an oil-impregnated bushing is constructed by impregnating a bushing with lubricating oil having a kinematic viscosity at 40° C. within a predetermined numerical range and said oil-impregnated bushing is used as a bearing. It is to be noted that the following numerical range of kinematic viscosity is set on the basis of the lower limit value of a standard width (a width relative to the standard median) of kinematic viscosity of lubricating oil contained in the oil-impregnated bushing with which a favorable abrasion resistant life can be obtained.

That is, an oil-impregnated bushing according to the first invention is an oil-impregnated bushing made of a metal sintered body impregnated with lubricating oil containing perfluoropolyether as a major ingredient, characterized in that the lubricating oil has a kinematic viscosity of 350 mm$^2$/s or more at 40° C.

An oil-impregnated bushing according to the second invention is the oil-impregnated bushing of the first invention, characterized in that the kinematic viscosity is 720 mm$^2$/s or more.

An oil-impregnated bushing according to the third invention is the oil-impregnated bushing of the first invention, characterized in that the kinematic viscosity is 1020 mm$^2$/s or more.

An oil-free chain according to the fourth invention is an oil-free chain obtained by connecting a pair of inner link plates which are connected by two oil-impregnated bushings, and a pair of outer link plates which are connected by two pins inserted into adjacent oil-impregnated bushings of adjacent inner link plates, alternately, characterized in that said oil-impregnated bushing is an oil-impregnated bushing according to any one of the first invention to the third invention.

A method for manufacturing an oil-impregnated bushing according to the fifth invention is a method for manufacturing an oil-impregnated bushing comprising a step of impregnating a bushing made of a metal sintered body with lubricating oil containing perfluoropolyether as a major ingredient, characterized in that said step is a step of impregnating the bushing with lubricating oil having a kinematic viscosity of 350 mm$^2$/s or more at 40° C.

A method for manufacturing an oil-impregnated bushing according to the sixth invention is a method for manufacturing an oil-impregnated bushing comprising a step of impregnating a bushing made of a metal sintered body with lubricating oil containing perfluoropolyether as a major ingredient, characterized in that said step is a step of impregnating the bushing with lubricating oil having a kinematic viscosity of 720 mm$^2$/s or more at 40° C.

A method for manufacturing an oil-impregnated bushing according to the seventh invention is a method for manufacturing an oil-impregnated bushing comprising a step of impregnating a bushing made of a metal sintered body with lubricating oil containing perfluoropolyether as a major ingredient, characterized in that said step is a step of impregnating the bushing with lubricating oil having a kinematic viscosity of 1020 mm$^2$/s or more at 40° C.

In an oil-impregnated bushing according to the present invention, the lubricating oil has a sufficiently high kinematic viscosity even under high-temperature environment when the oil-impregnated bushing is used as a bearing for an oil-free chain or the like, and therefore excessive flowing out of lubricating oil from pores of the oil-impregnated bushing and from a sliding part is inhibited. Accordingly, lubricating oil having a preferred kinematic viscosity is supplied to the inner circumferential face of the oil-impregnated bushing over a long period of time, oil film discontinuity does not arise at a sliding part, the lubricity of a sliding contact face is retained favorably, and a favorable abrasion resistant life as a bearing is realized.

In an oil-free chain according to the present invention, the lubricating oil has a sufficiently high kinematic viscosity even when the oil-free chain is used under high-temperature environment such as an ambient temperature of 150° C. to 250° C., and therefore excessive flowing out of lubricating oil from pores of the oil-impregnated bushing and from a sliding part is inhibited, oil film discontinuity does not arise at a sliding part and the lubricity of a sliding contact face is retained favorably. Accordingly, a favorable abrasion elongation-resistant life is realized.

In a method for manufacturing an oil-impregnated bushing according to the present invention comprising a step of impregnating a bushing with lubricating oil having a kinematic viscosity corresponding to the operating temperature of the oil-impregnated bushing, the lubricating oil has a sufficiently high kinematic viscosity under high-temperature environment when said oil-impregnated bushing is used for constituting a machine element such as an oil-free chain, and therefore excessive flowing out of lubricating oil from pores of the oil-impregnated bushing and from a sliding part is inhibited, oil film discontinuity does not arise at a sliding part, the lubricity of a sliding contact face is retained favorably over a long period of time and the machine element has a favorable abrasion resistant life. Furthermore, the temperature of the lubricating oil itself is not increased by frictional heat since the kinematic viscosity it not too high.

With an oil-impregnated bushing of the present invention constructed by impregnating a bushing with lubricating oil having a kinematic viscosity of 350 mm$^2$/s or more at 40° C., the lubricating oil has a sufficiently high kinematic viscosity even under high-temperature environment when the oil-impregnated bushing is used as a bearing for an oil-free chain or the like, and therefore oil film discontinuity does not arise at a sliding part and a favorable abrasion resistant life is realized.

With an oil-free chain of the present invention wherein an oil-impregnated bushing of the present invention is used, the lubricating oil has a sufficiently high kinematic viscosity even when the oil-free chain is used under high-temperature environment such as an ambient temperature of 150° C. to 250° C., and therefore oil film discontinuity does not arise at a sliding part, the lubricity of a sliding contact face of the oil-free chain is retained favorably over a long period of time and a preferable abrasion elongation-resistant life is realized.

With a method for manufacturing an oil-impregnated bushing of the present invention comprising a step of impregnating a bushing with lubricating oil having a kinematic viscosity corresponding to the operating temperature of the oil-impregnated bushing, the lubricating oil has a sufficiently high kinematic viscosity even under high-temperature environment when said oil-impregnated bushing is used for a bearing of an oil-free chain or the like, and therefore oil film discontinuity does not arise at a sliding part and a favorable abrasion resistant life is realized over a long period of time.

The above and further objects and features will more fully be apparent from the following detailed description with accompanying drawings.

DETAILED DESCRIPTION

The following description will explain the present invention in detail with reference to the drawings illustrating some embodiments thereof.

Embodiment 1

Figure 1:
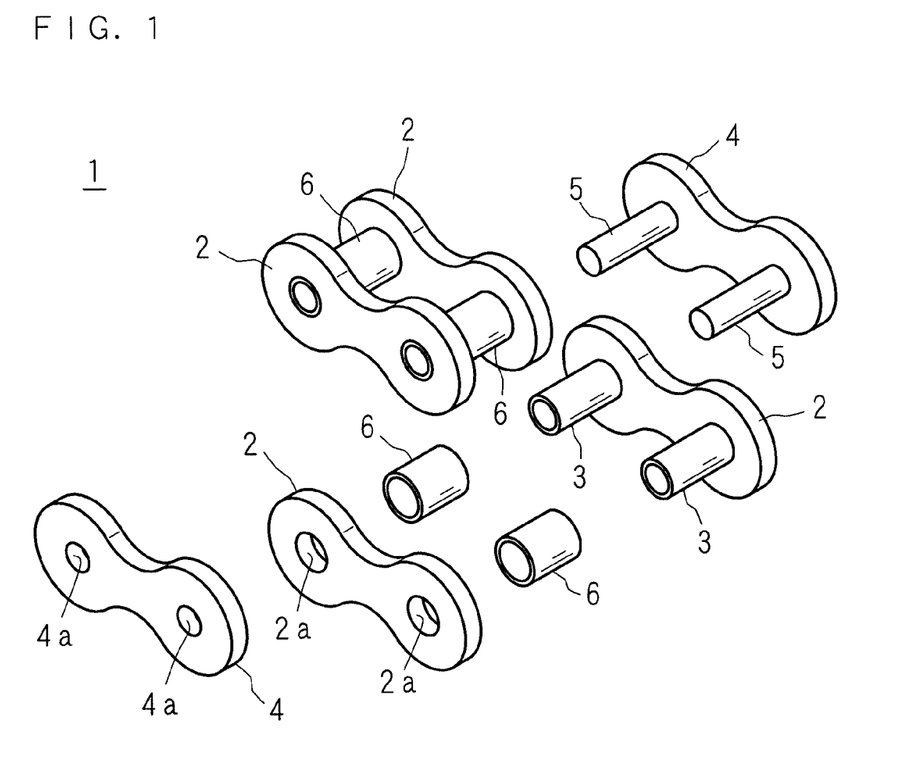
FIG. 1 is a partial perspective view for illustrating an oil-free chain according to Embodiment 1 of the present invention

FIG. 1 is a partial perspective view for illustrating an oil-free chain 1 according to Embodiment 1 of the present invention.

Each inner link plate 2 and each outer link plate 4 of the oil-free chain 1 respectively have substantially a figure of eight having inward arc recesses formed at both side fringes in a central part of an elliptical flat member and having holes 2a, 2a and holes 4a, 4a formed at the neighborhood of both sides of the ellipse, and the plate width and the diameter of the formed holes of each inner link plate 2 are larger than those of each outer link plate 4. The inner link plates 2, 2 are connected with each other by closely fitting one end of each of cylindrical oil-impregnated bushings 3, 3 in each of two holes 2a, 2a of one inner link plate 2 and closely fitting the other end of each of the oil-impregnated bushings 3, 3 in each of holes 2a, 2a of the other inner link plate 2. Tubular rollers 6, 6 having an inner diameter larger than the outer diameter of the oil-impregnated bushings 3, 3 are rotatably fitted on the oil-impregnated bushings 3, 3.

One end of each of columnar pins 5, 5 is closely fitted in each of two holes 4a, 4a of one outer link plate 4. The pins 5, 5 have a diameter smaller than the inner diameter of the oil-impregnated bushings 3, 3 and are larger in length than the interval between the inner link plates 2, 2.

The outer link plates 4, 4 and two pairs of inner link plates 2, 2 are connected with each other by closely fitting the other end of each of the pins 5, 5 in each of the holes 4a, 4a of the other outer link plate 4 with the pins 5, 5 being inserted into adjacent oil-impregnated bushings 3, 3 of adjacent inner link plates 2, 2. As described above, the oil-free chain 1 is constructed by connecting the outer link plates 4, 4 and the inner link plates 2, 2 alternately.

Each oil-impregnated bushing 3 is made of sintered metal of iron series and has a large number of pores.

Lubricating oil for impregnation of each oil-impregnated bushing 3 contains PFPE as a major ingredient. PFPE, which is made from carbon, oxygen and fluorine and contains no hydrogen and no chlorine, has excellent high heat resistance and excellent oxidation resistance, has low vapor pressure and has a property of hardly evaporating even under high vacuum. The following Chemical Formulas 1 to 5 respectively represent examples of the structural formula of PFPE.

[Chemical Formula 1]
[Chemical Formula 2]
[Chemical Formula 3]
[Chemical Formula 4]
[Chemical Formula 5]

PFPE represented by each of Chemical Formulas 4 and 5 has a straight-chain structure while PFPE represented by each of Chemical Formulas 1 to 3 has a side-chain group. PFPE having a straight-chain structure generally has strong molecular binding power at high temperature and has superior thermal stability but is expensive. PFPE having a side-chain group generally has high kinematic viscosity, excessive flowing out of said PFPE from pores of the oil-impregnated bushing 3 and from a sliding part is inhibited and oil film discontinuity is inhibited, and therefore it is preferable to use PFPE having a side-chain group or to use said PFPE in combination with PFPE having a straight-chain structure. The ratio of PFPE having a side-chain group to the total mass of PFPE is preferably 50 to 100% by mass.

The lubricating oil can be compounded with viscosity bodying agent such as PTFE or the like, for example, in addition to PFPE.

The lubricating oil preferably has a kinematic viscosity of 350 mm$^2$/s or more at 40° C. In the case where the oil-free chain 1 is to be used at an ambient temperature equal to or higher than 150° C. and lower than 200° C., the kinematic viscosity at 40° C. is more preferably equal to or higher than 720 mm$^2$/s. In the case where the oil-free chain 1 is to be used at an ambient temperature equal to or higher than 200° C., the kinematic viscosity at 40° C. is more preferably equal to or higher than 1020 mm$^2$/s.

In the case where the kinematic viscosity is equal to or higher than 350 mm$^2$/s, the lubricating oil has a sufficiently high kinematic viscosity even when the oil-free chain 1 is used at an ambient temperature of 150° C. to 250° C., and therefore excessive flowing out of lubricating oil from pores of the oil-impregnated bushing 3 and from a sliding part is inhibited, oil film discontinuity does not arise, the lubricity of a sliding contact face is retained favorably over a long period of time and the oil-free chain 1 has a favorable abrasion elongation-resistant life.

The following description will explain a method for manufacturing an oil-impregnated bushing 3.

For manufacturing an oil-impregnated bushing 3 by impregnating a bushing made of sintered metal of iron series with lubricating oil, a series of processes are performed to draw a vacuum, dip a bushing into lubricating oil containing PFPE as a major ingredient and then introduce ambient air so as to cause osmosis of the lubricating oil into the bushing. Alternatively, a series of processes may be performed to dip a bushing into lubricating oil, then draw a vacuum and introduce ambient air so as to cause osmosis of the lubricating oil into the bushing. The treatment temperature is approximately 100 to 150° C.

In the case where the oil-free chain 1 is to be used at an ambient temperature equal to or higher than 150° C. and lower than 200° C., it is preferable to impregnate a bushing with lubricating oil having a kinematic viscosity at 40° C. equal to or higher than 350 mm$^2$/s, and it is more preferable to impregnate a bushing with lubricating oil having a kinematic viscosity equal to or higher than 720 mm$^2$/s.

In the case where the oil-free chain 1 is to be used at an ambient temperature equal to or higher than 200° C., it is preferable to impregnate a bushing with lubricating oil having a kinematic viscosity of 720 mm$^2$/s or more at 40° C., and it is more preferable to impregnate a bushing with lubricating oil having a kinematic viscosity of 1020 mm$^2$/s or more.

In the oil-free chain 1 according to the present embodiment, a bushing is impregnated with lubricating oil having a preferred kinematic viscosity depending on the operating temperature of the oil-free chain 1, and therefore oil film discontinuity at a sliding part is inhibited over a long period of time, the lubricity of a sliding contact face is retained favorably and abrasion of the oil-impregnated bushing 3 and the pin 5 is inhibited without additional lubrication. Accordingly, the abrasion elongation-resistant life of the oil-free chain 1 is lengthened. Also, a problem that the temperature of the lubricating oil itself is increased by frictional heat does not arise since the kinematic viscosity it not too high.

Embodiment 2

Figure 2:
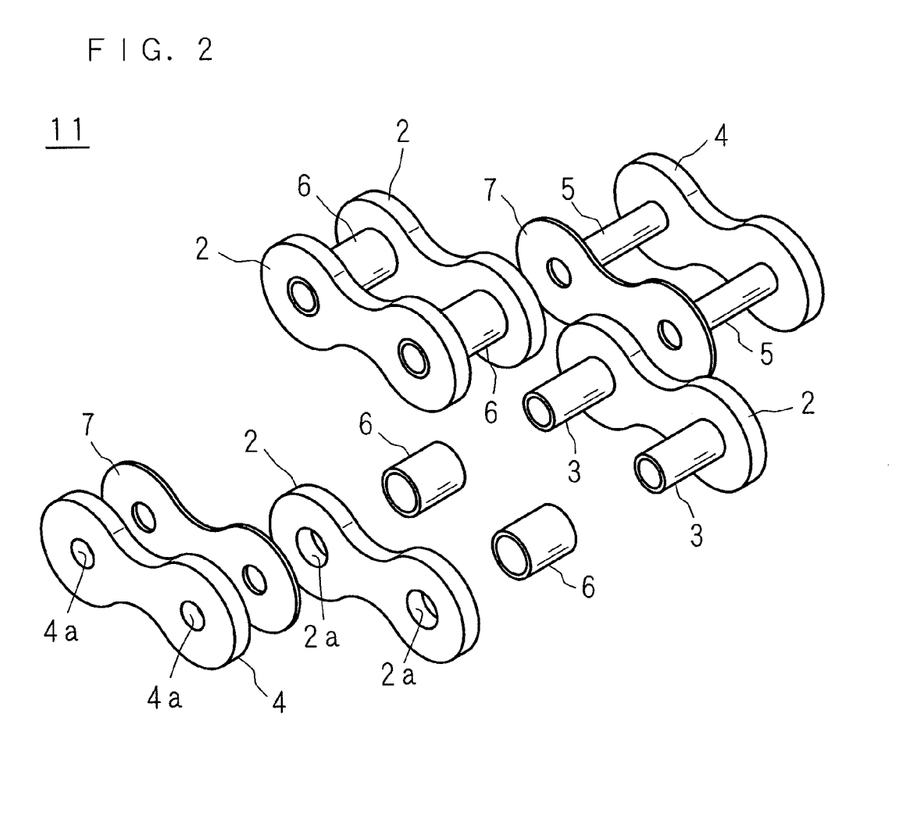
FIG. 2 is a partial perspective view for illustrating an oil-free chain according to Embodiment 2 of the present invention

FIG. 2 is a partial perspective view for illustrating an oil-free chain 11 according to Embodiment 2 of the present invention. In the figure, identical codes are given to parts identical to those in FIG. 1 and detailed description thereof is omitted.

The oil-free chain 11 according to the present embodiment is different from the oil-free chain 1 according to Embodiment 1 in that sealing members 7, 7 having substantially the same shape as that of outer link plates 4, 4 are in contact with the inner face of the outer link plates 4, 4. The sealing members 7, 7 are formed as a felt by using PTFE and are impregnated with PFPE.

In the present embodiment, pores of an oil-impregnated bushing 3 are impregnated with the lubricating oil in the same manner as Embodiment 1. Accordingly, lubricating oil having a preferred kinematic viscosity is supplied to the inner circumferential face of the oil-impregnated bushing 3, and therefore the lubricity of a sliding contact face of the oil-impregnated bushing 3 and the pin 5 is retained favorably over a long period of time. Furthermore, flowing out of lubricating oil between the oil-impregnated bushing 3 and the pin 5 is inhibited by the sealing members 7, 7 and PFPE is supplied also from the sealing members 7, 7, and therefore the lubricity is further enhanced and the abrasion elongation-resistant life is further lengthened.

Embodiment 3

Figure 3:
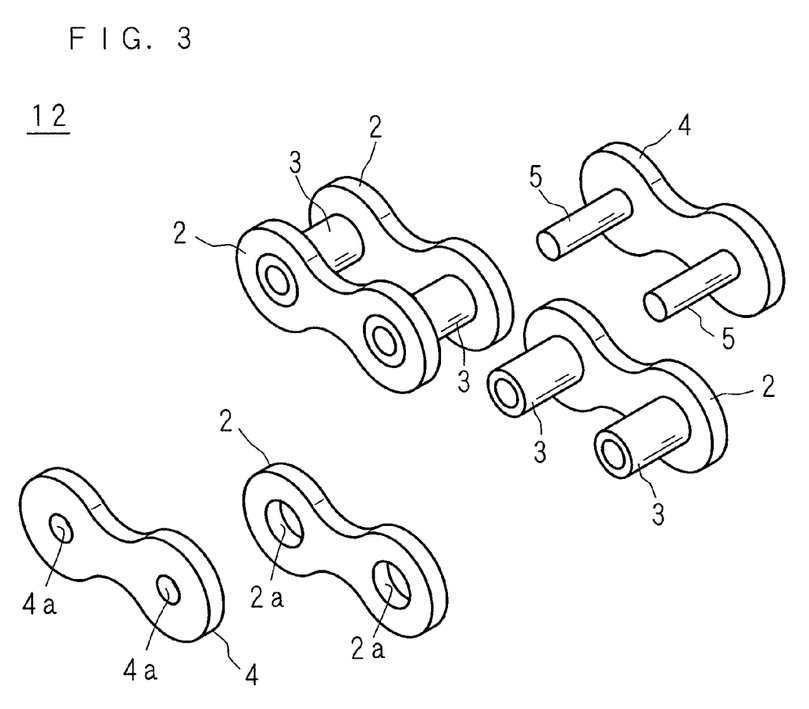
FIG. 3 is a partial perspective view for illustrating an oil-free chain according to Embodiment 3 of the present invention

FIG. 3 is a partial perspective view for illustrating an oil-free chain 12 according to Embodiment 3 of the present invention. In the figure, identical codes are given to parts identical to those in FIG. 1 and detailed description thereof is omitted.

The oil-free chain 12 according to the present embodiment is different from the oil-free chain 1 according to Embodiment 1 in that the rollers 6, 6 are not provided.

In the present embodiment, pores of an oil-impregnated bushing 3 are impregnated with the lubricating oil in the same manner as Embodiment 1. Lubricating oil having a preferred kinematic viscosity is supplied to the inner circumferential face of the oil-impregnated bushing 3, and therefore the lubricity of a sliding contact face of the oil-impregnated bushing 3 and the pin 5 is retained favorably over a long period of time and the abrasion elongation-resistant life at high temperature is lengthened.

EXAMPLES

The following description will explain the present invention in detail with reference to examples.

Example 1

An oil-free chain of Example 1 has the same structure as that of the oil-free chain 1 according to Embodiment 1.
PFPE of "BARRIERTA J 400 FLUID" (kinematic viscosity at 40° C.: catalogue value of 390 mm$^2$/s, standard width of 351 to 429 mm$^2$/s) produced by NOK KLUBER Co., Ltd. was used as lubricating oil for impregnation of an oil-impregnated bushing of said oil-free chain.

A bushing was dipped into the lubricating oil, pores of the bushing were impregnated with the lubricating oil, and an oil-free chain of Example 1 was prepared using the obtained oil-impregnated bushing.

Example 2

An oil-free chain of Example 2 has the same structure as that of the oil-free chain 1 according to Embodiment 1. An oil-free chain was prepared in the same manner as Example 1, except that PFPE of "BARRIERTA J 800 FLUID" (kinematic viscosity at 40° C.: catalogue value of 800 mm$^2$/s, standard width of 720 to 880 mm$^2$/s) produced by NOK KLUBER Co., Ltd. was used as lubricating oil for impregnation of an oil-impregnated bushing.

Example 3

An oil-free chain of Example 3 has the same structure as that of the oil-free chain 1 according to Embodiment 1. An oil-free chain was prepared in the same manner as Example 1, except that PFPE of a product (standard width of 1020 to 1380 mm$^2$/s) corresponding to a kinematic viscosity at 40° C. of 1200 mm$^2$/s in "BARRIERTA J" series produced by NOK KLUBER Co., Ltd. was used as lubricating oil for impregnation of an oil-impregnated bushing.

Comparative Example 1

An oil-free chain of Comparative example 1 has the same structure as that of the oil-free chain 1 according to Embodiment 1. An oil-free chain was prepared in the same manner as Example 1, except that PFPE of "BARRIERTA J 180 FLUID" (kinematic viscosity at 40° C.: catalogue value of 180 mm$^2$/s, standard width of 162 to 198 mm$^2$/s) produced by NOK KLUBER Co., Ltd. was used as lubricating oil for impregnation of an oil-impregnated bushing.

In order to evaluate the abrasion elongation-resistant life of the oil-free chains according to Examples 1 to 3 and Comparative example 1, the abrasion elongation amount of each oil-free chain was measured at ambient temperatures of 150° C., 200° C. and 250° C. Here, the oil-free chain of Comparative example 1 was not tested at an ambient temperature of 250° C. which exceeds the operating temperature limit.

Figure 4:
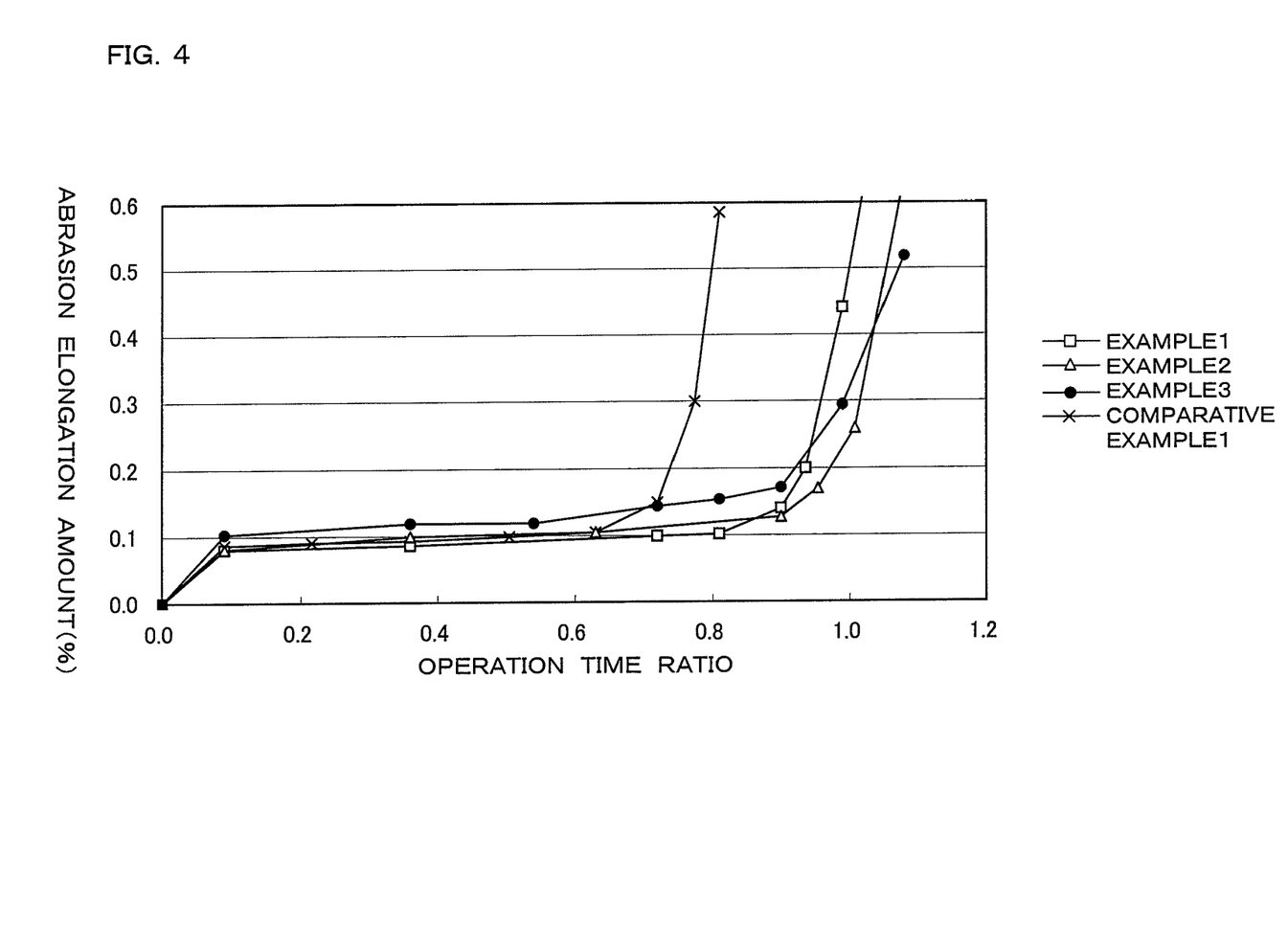
FIG. 4 is a graph for illustrating the relation between the operating time ratio and the abrasion elongation amount at an ambient temperature of 150° C.
Figure 5:
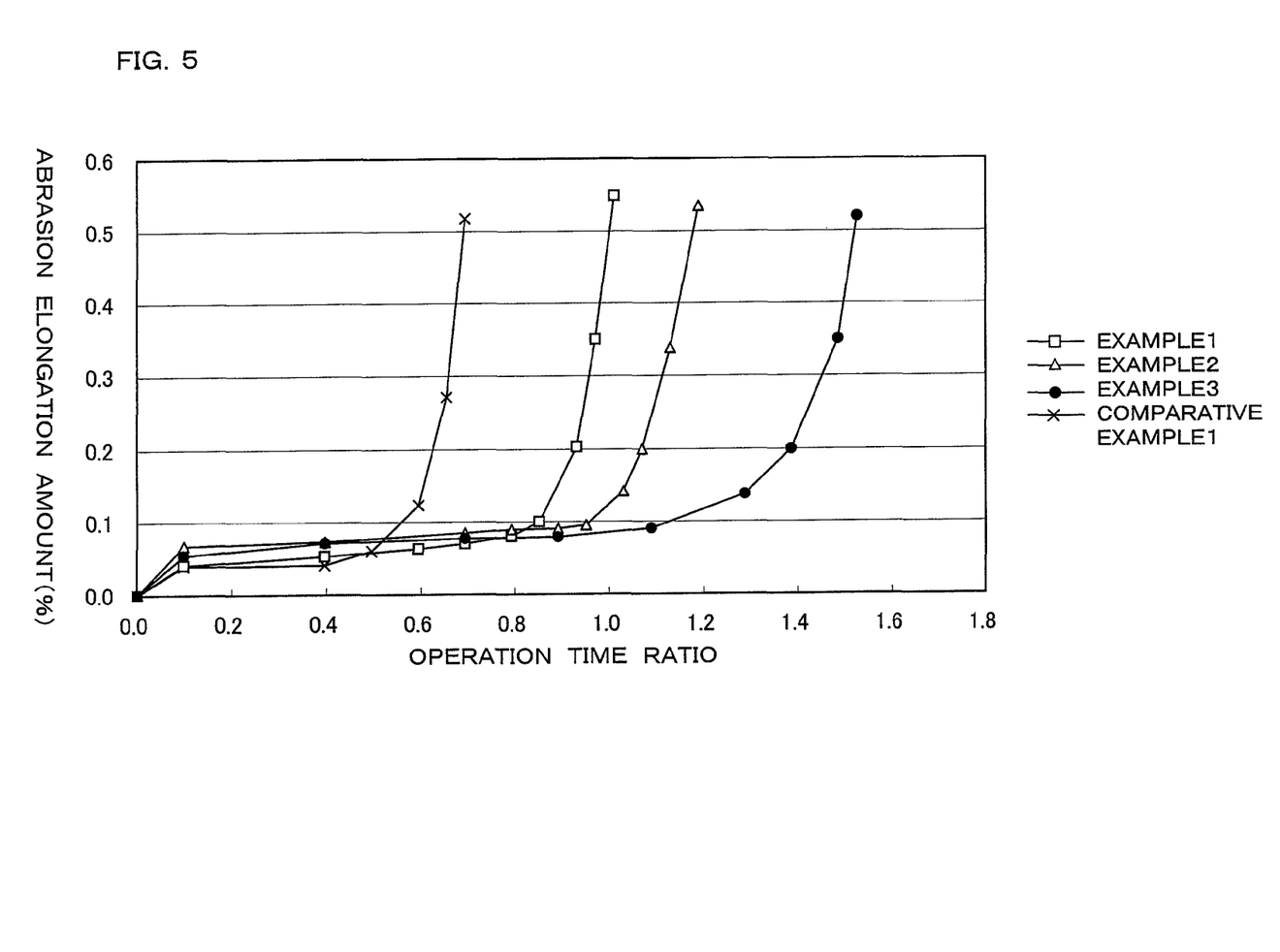
FIG. 5 is a graph for illustrating the relation between the operating time ratio and the abrasion elongation amount at an ambient temperature of 200° C.
Figure 6:
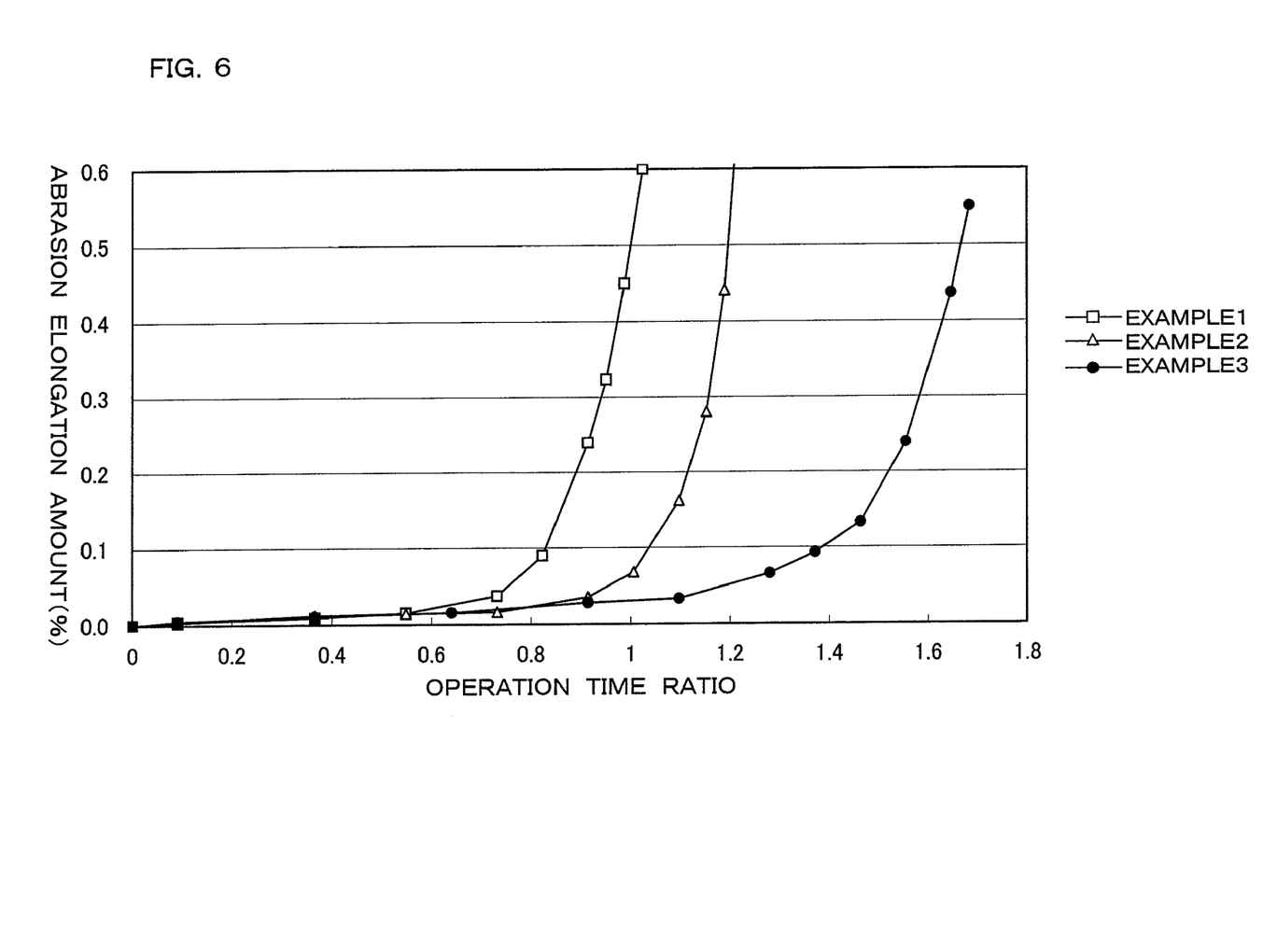
FIG. 6 is a graph for illustrating the relation between the operating time ratio and the abrasion elongation amount at an ambient temperature of 250° C.

Each oil-free chain was wound around two sprockets (number of teeth: 16 T, rotational speed: 500 r/min) in an endless manner and a running test was carried out with transmission ability: 6.33 kW in the case of an ambient temperature of 150° C., with transmission ability: 4.75 kW in the case of an ambient temperature of 200° C. and with transmission ability: 3.17 kW in the case of an ambient temperature of 250° C. The result is illustrated in the graphs in FIGS. 4 to 6. FIG. 4 is a graph for illustrating the relation between the operating time ratio and the abrasion elongation amount at an ambient temperature of 150° C., FIG. 5 is a graph for illustrating the relation between the operating time ratio and the abrasion elongation amount at an ambient temperature of 200° C., and FIG. 6 is a graph for illustrating the relation between the operating time ratio and the abrasion elongation amount at an ambient temperature of 250° C. In all the graphs, the operating time when the abrasion elongation amount of Example 1 reaches 0.5% is represented as 1.

As is clear from the graph in FIG. 4, the oil-free chains of Examples 1 to 3 have substantially the same abrasion elongation-resistant life while the oil-free chain of Comparative example 1 has an abrasion elongation-resistant life approximately 20% shorter than the other oil-free chains in the test at an ambient temperature of 150° C.

Moreover, as is clear from the graph in FIG. 5, the oil-free chain of Example 2 has an abrasion elongation-resistant life approximately 20% longer than the oil-free chain of Example 1, the oil-free chain of Example 3 has an abrasion elongation-resistant life approximately 50% longer than the oil-free chain of Example 1, and the oil-free chain of Comparative example 1 has an abrasion elongation-resistant life approximately 30% shorter than the oil-free chain of Example 1 in the test at an ambient temperature of 200° C.

Also, as is clear from the graph in FIG. 6, the oil-free chain of Example 2 has an abrasion elongation-resistant life approximately 20% longer than the oil-free chain of Example 1 and the oil-free chain of Example 3 has an abrasion elongation-resistant life approximately 65% longer than the oil-free chain of Example 1 in the test at an ambient temperature of 250° C.

As described above, it was demonstrated that the abrasion elongation-resistant life of an oil-free chain is lengthened when a bushing is impregnated with lubricating oil having a kinematic viscosity corresponding to the operating temperature of an oil-free chain and an oil-free chain is constructed using said oil-impregnated bushing.

It was also demonstrated regarding oil-free chains according to Embodiments 2 and 3 that the abrasion elongation-resistant life of an oil-free chain is lengthened when a bushing is impregnated with lubricating oil having a kinematic viscosity corresponding to the operating temperature of an oil-free chain and an oil-free chain is constructed using said oil-impregnated bushing.

INDUSTRIAL APPLICABILITY

An oil-impregnated bushing of the present invention can be applied to machine elements such as an oil-free chain of a type such as a bushing chain or a roller chain to be used for a power transmission mechanism, a conveyance mechanism and the like.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. An oil-impregnated bushing made of a metal sintered body impregnated with lubricating oil containing perfluoropolyether as a major ingredient, wherein
the lubricating oil has a kinematic viscosity of 350 mm$^2$/s or more at 40° C.

2. The oil-impregnated bushing according to claim 1, wherein the kinematic viscosity is 720 mm$^2$/s or more.

3. The oil-impregnated bushing according to claim 1, wherein the kinematic viscosity is 1020 mm$^2$/s or more.

4. An oil-free chain obtained by connecting a pair of inner link plates which are connected by two oil-impregnated bushings, and a pair of outer link plates which are connected by two pins inserted into adjacent oil-impregnated bushings of adjacent inner link plates, alternately, wherein
said oil-impregnated bushing is an oil-impregnated bushing according to claim 1.

5. An oil-free chain obtained by connecting a pair of inner link plates which are connected by two oil-impregnated bushings, and a pair of outer link plates which are connected by two pins inserted into adjacent oil-impregnated bushings of adjacent inner link plates, alternately, wherein
said oil-impregnated bushing is an oil-impregnated bushing according to claim 2.

6. An oil-free chain obtained by connecting a pair of inner link plates which are connected by two oil-impregnated bushings, and a pair of outer link plates which are connected by two pins inserted into adjacent oil-impregnated bushings of adjacent inner link plates, alternately, wherein
said oil-impregnated bushing is an oil-impregnated bushing according to claim 3.

7. A method for manufacturing an oil-impregnated bushing comprising a step of impregnating a bushing made of a metal sintered body with lubricating oil containing perfluoropolyether as a major ingredient, wherein
said step is a step of impregnating the bushing with lubricating oil having a kinematic viscosity of 350 mm$^2$/s or more at 40° C.

8. A method for manufacturing an oil-impregnated bushing comprising a step of impregnating a bushing made of a metal sintered body with lubricating oil containing perfluoropolyether as a major ingredient, wherein
said step is a step of impregnating the bushing with lubricating oil having a kinematic viscosity of 720 mm$^2$/s or more at 40° C.

9. A method for manufacturing an oil-impregnated bushing comprising a step of impregnating a bushing made of a metal sintered body with lubricating oil containing perfluoropolyether as a major ingredient, wherein
said step is a step of impregnating the bushing with lubricating oil having a kinematic viscosity of 1020 mm$^2$/s or more at 40° C.

* * * * *